US009081864B2

(12) United States Patent
Meyler et al.

(10) Patent No.: US 9,081,864 B2
(45) Date of Patent: Jul. 14, 2015

(54) LATE RESOURCE LOCALIZATION BINDING FOR WEB SERVICES

(75) Inventors: Laurence Meyler, Dublin (IE); Adrian Cadden, Wicklow (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 179 days.

(21) Appl. No.: 12/850,361

(22) Filed: Aug. 4, 2010

(65) Prior Publication Data

US 2012/0036265 A1   Feb. 9, 2012

(51) Int. Cl.
*G06F 15/173*  (2006.01)
*G06F 17/30*  (2006.01)

(52) U.S. Cl.
CPC ........ *G06F 17/3089* (2013.01); *G06F 17/3087* (2013.01); *G06F 17/30899* (2013.01)

(58) Field of Classification Search
USPC .......................................... 709/203, 226, 246
See application file for complete search history.

(56) References Cited

U.S. PATENT DOCUMENTS

| | | | |
|---|---|---|---|
| 6,490,547 B1 | 12/2002 | Atkin et al. | |
| 7,444,590 B2 | 10/2008 | Christian et al. | |
| 7,607,085 B1 * | 10/2009 | Lassesen | 715/264 |
| 7,836,303 B2 * | 11/2010 | Levy et al. | 713/168 |
| 2002/0138562 A1 * | 9/2002 | Wies et al. | 709/203 |
| 2002/0169802 A1 * | 11/2002 | Brewer et al. | 707/513 |
| 2002/0174196 A1 * | 11/2002 | Donohoe et al. | 709/219 |
| 2003/0005159 A1 * | 1/2003 | Kumhyr | 709/246 |
| 2003/0204573 A1 * | 10/2003 | Beck et al. | 709/218 |
| 2006/0271352 A1 * | 11/2006 | Nikitin et al. | 704/9 |
| 2008/0028305 A1 | 1/2008 | Kim et al. | |
| 2008/0209395 A1 * | 8/2008 | Ernst | 717/115 |
| 2009/0287471 A1 | 11/2009 | Bennett | |
| 2012/0017146 A1 * | 1/2012 | Travieso et al. | 715/265 |
| 2013/0124498 A1 * | 5/2013 | Bennett | 707/709 |

FOREIGN PATENT DOCUMENTS

WO   WO-2004059521   7/2004

OTHER PUBLICATIONS

"Creating JRas Resource Bundles and Message Files", Retrieved from: <http://publib.boulder.ibm.com/infocenter/wasinfo/beta/index.jsp?topic=/com.ibm.websphere.express.doc/info/exp/ae/ttrb_jrasmkrbs.html> on Jul. 27, 2010, (Jun. 28, 2010),2 pages.

"How to: Set the Culture and UI Culture for Asp.Net Web Page Globalization", Retrieved from: <http://msdn.microsoft.com/en-us/library/bz9tc508.aspx> on Jul. 27, 2010, (May 7, 2008),4 pages.

"Streamlining Localization Processes with Altova Tools", Retrieved from: <http://www.altova.com/localization.html> Jul. 27, 2010,7 pages.

(Continued)

*Primary Examiner* — Joshua Joo
(74) *Attorney, Agent, or Firm* — John Jardine; Kate Drakos; Micky Minhas

(57) ABSTRACT

Various embodiments provide a client-side approach to enable late-binding, at the client, of resources associated with linguistic strings that are retrieved from a data source that is secondary to a primary server. The client-side, late-binding approach can be performed in a manner that is generally imperceptible to users and which preserves user interface formatting and client functionality.

20 Claims, 4 Drawing Sheets

(56) References Cited

OTHER PUBLICATIONS

Ferguson, Arron "Creating a declarative XML UI language", Retrieved from: <http://www.ibm.com/developerworks/java/library/x-decxmlui/index.html> on Jul. 27, 2010, (Sep. 1, 2009),24 pages.

Lewis, David "Web Service Integration for Next Generation Localisation", In Proceedings of WWW 2009, Available at <http://www.aclweb.org/anthology/W/W09/W09-1509.pdf>,(Jun. 5, 2009),pp. 47-55.

Raya, Rodolfo M., "An overview of the most relevant XML standards used in the localisation industry", Retrieved from: <http://www.maxprograms.com/articles/analysis.html> on Jul. 27, 2010, (Aug. 2004), 5 pages.

"Foreign Office Action", Chinese Application No. 201110222288.3, (Sep. 12, 2012), 7 pages.

"Foreign Office Action", Chinese Application No. 201110222288.3, (Apr. 16, 2013), 4 pages.

"Foreign Office Action", CN Application No. 201110222288.3, Dec. 9, 2013, 6 Pages.

"Translation Web Services", Retrieved from: <http://www.lionbridge.com/lionbridge/en-US/services/localization-translation/web-services-connectivity.htm> on May 22, 2014, Mar. 31, 2008, 2 pages.

"Reexamination Decision", CN Application No. 201110222288.3, Jan. 17, 2015, 2 pages.

"Foreign Office Action", CN Application No. 201110222288.3, Aug. 19, 2014, 8 Pages.

"Extended European Search Report", EP Application No. 11814991.3, May 9, 2014, 4 pages.

"Foreign Office Action", CN Application No. 201110222288.3, May 5, 2015, 7 Pages.

* cited by examiner

LATE RESOURCE LOCALIZATION BINDING FOR WEB SERVICES

BACKGROUND

Typically, user interface HTML and localizable resources are downloaded as an integrated HTML stream which is then loaded into a web browser's document object model (DOM) and rendered. In international scenarios where different language translations for web resources are desirable to accommodate different languages or cultures across the globe, today's typical approach utilizes what is referred to as "build-time" binding. In build-time binding, translations and associated source values are bound to a resource prior to being deployed on a server from which the resource can be accessed. This means that once a Web service is built for a particular language, the bindings are fixed. Modifying such build-time, bound resources typically means that the entire Web service must be designed and extended to support the new cultures. This leads to inflexible and costly designs.

Further, given that there are many languages in the world that might be desirable to support for any given collection of the webpages and associated resources, build-time binding forces the server to support only the set of languages defined by the product team at build time. Supporting all known languages would be a daunting and expensive task.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide a client-side approach to enable late-binding, at the client device, of resources associated with linguistic strings that are retrieved from a data source that is secondary to a primary server. The client-side, late-binding approach can be performed in a manner that is generally imperceptible to users and which preserves user interface formatting and client functionality.

In at least some embodiments, the notion of a late-bind culture is introduced. The late-bind culture is hosted on a Web server associated with a Web Application. A Web Application can be thought of as a Web-obtainable service or product that can be obtained, for example, through the use of a URL. Examples include, by way of example and not limitation, email services or products, such as Hotmail, calendar services or products, and the like.

When a Web browser executing on a client device requests, from the Web server, a Web Application in a language that is not physically hosted on the Web server for that Web Application, the Web browser is navigated to a late-bind culture hosted by the Web server. The late-bind culture includes information that can be used, by or on behalf of the Web browser, to obtain localized linguistic resources, such as user interface elements, from a secondary or different Web service. The obtained localized linguistic resources can then be bound, on the client device, to an associated webpage and subsequently rendered on the client device.

BRIEF DESCRIPTION OF THE DRAWINGS

The same numbers are used throughout the drawings to reference like features.

DETAILED DESCRIPTION

Overview

Various embodiments provide a client-side approach to enable late-binding, at the client device, of resources associated with linguistic strings that are retrieved from a data source that is secondary to a primary server. The client-side, late-binding approach can be performed in a manner that is generally imperceptible to users and which preserves user interface formatting and client functionality.

In at least some embodiments, the notion of a late-bind culture is introduced. The late-bind culture is hosted on a Web server associated with a Web Application. A Web Application can be thought of as a Web-obtainable service or product that can be obtained, for example, through the use of a URL. Examples include, by way of example and not limitation, email services or products, such as Hotmail, calendar services or products, and the like.

When a Web browser executing on a client device requests, from the Web server, a Web Application in a language that is not physically hosted on the Web server for that Web Application, the Web browser is navigated to a late-bind culture hosted by the Web server. The late-bind culture includes information that can be used, by or on behalf of the Web browser, to obtain localized linguistic resources, such as user interface elements, from a secondary or different Web service. The obtained localized linguistic resources can then be bound, on the client device, to an associated webpage and subsequently rendered on the client device.

In the discussion that follows, a section entitled "Operating Environment" is provided and describes one environment in which one or more embodiments can be employed. Following this, a section entitled "Example Embodiments" describes various embodiments that can utilize the late binding culture. Next, a section entitled "Example Method" describes an example method in accordance with one or more embodiments. Last, a section entitled "Example System" describes an example system that can be used to implement one or more embodiments.

Operating Environment

Figure 1:
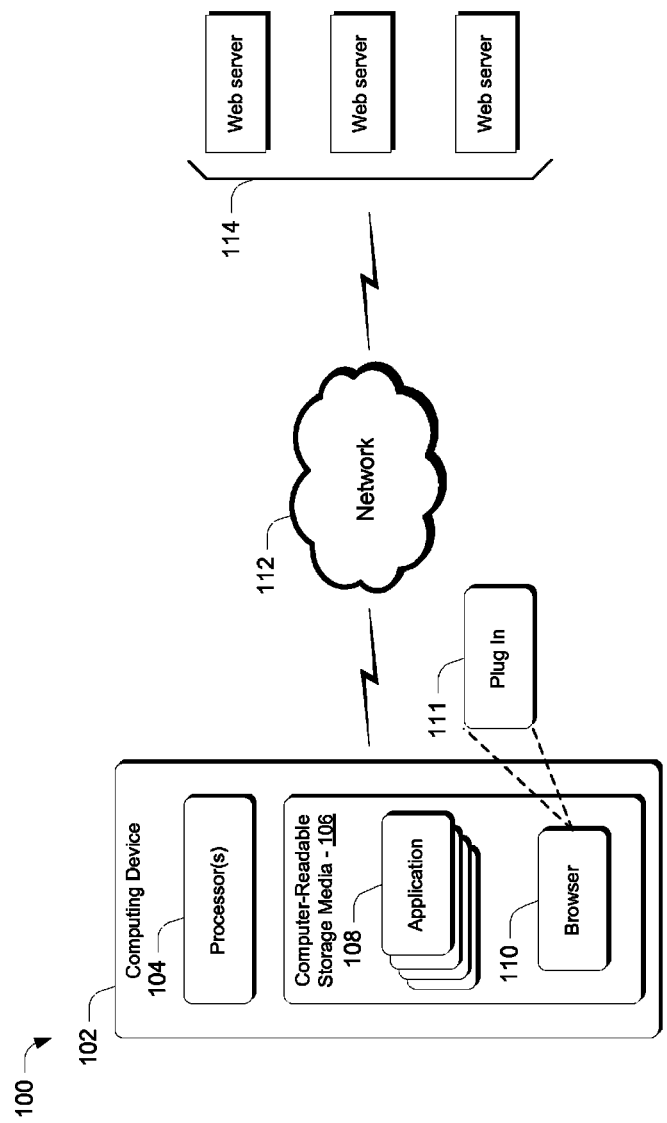
FIG. 1 illustrates an operating environment in which various principles described herein can be employed in accordance with one or more embodiments.

FIG. 1 illustrates an operating environment in accordance with one or more embodiments, generally at 100. Environment 100 includes a computing device 102 having one or more processors 104, one or more computer-readable storage media 106 and one or more applications 108 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 4.

In addition, computing device 102 includes a software application in the form of a web browser 110. Any suitable web browser can be used examples of which are available from the assignee of this document and others. In addition, browser 110 can include one or more plug-ins 111. The late-binding functionality described herein can be implemented, at least in part, by the browser and/or one or more plug-ins.

In addition, environment 100 includes a network 112, such as the Internet, and one or more web servers 114 or Web services from and to which content can be received and sent, as described above and below. Such content can include structured documents such as HTML documents and other web content that can be rendered by web browser 110 and/or one or more plug-ins 111.

Computing device 102 can be embodied as any suitable computing device such as, by way of example and not limitation, a desktop computer, a portable computer, a handheld computer such as a personal digital assistant (PDA), cell phone, and the like.

Having described an example operating environment, consider now a discussion of some example embodiments that can utilize the late-bind culture.

Example Embodiments

Figure 2:
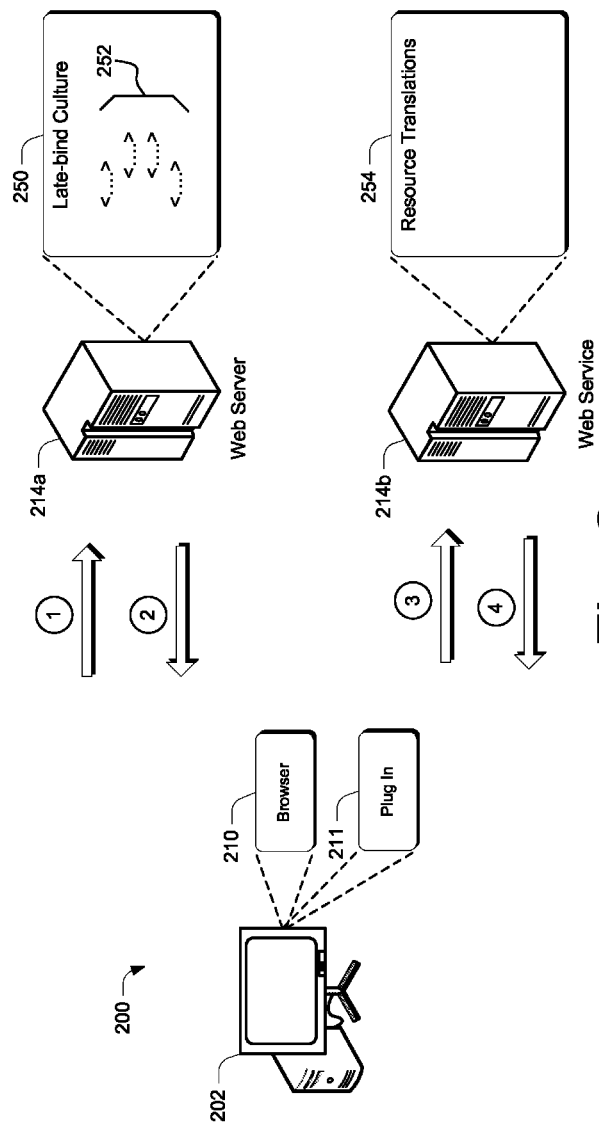
FIG. 2 illustrates an example system in accordance with one or more embodiments.

FIG. 2 illustrates an example system in accordance with one or more embodiments generally at 200. In this example, system 200 includes a computing or client device 202 that includes a browser 210 and/or a plug-in 211 that can work in concert with the browser. In the illustrated and described embodiment, client device 202 utilizes an identifier that identifies the locale in which the client device resides and hence, the language associated with the client device. Any suitable identifier can be utilized. In at least some embodiments, a locale identifier or LCID can be utilized. An LCID is a 32-bit value, defined by Microsoft Windows®, that identifies a particular language. The LCID includes a language ID, a sort ID, and reserved bits, as will be appreciated by the skilled artisan.

System 200 also includes a Web server 214a and a Web service 214b. In the illustrated and described embodiment, Web server 214a hosts a late-bind culture 250. The late-bind culture 250 includes information 252 that can be used, by or on behalf of the Web browser 210, to obtain localized linguistic resources, such as user interface elements, from Web service 214b. In a sense, the late-bind culture serves as a template or shell that identifies a Web Application, its resources, where the resources are positioned, and the like.

The information 252 can be represented in any suitable form without departing from the spirit and scope of the claimed subject matter. In one or more embodiments, the information 252 can include markup language, such as XML markup language, that specifies a Web Application identifier, resources (e.g., by a string ID), and resource positions within XML document object model (DOM)-based user interfaces. The resources positions can be inferred by the position of the markup tags defining the resource identifier with a page's HTML. Thus, a Web Application identifier might identify an e-mail product, and a resource identifier would define the resource being referenced, such as a page title.

Web service 214b includes resource translations 254. The resource translations include language-specific translations of individual resources associated with various properties. So, for example, if the Web Application is an e-mail product, Web service 214b would include resource translations for the email product in languages other than those supported by Web server 214a. The resource translations are identified by not only the Web Application with which they are associated, but a unique identifier such as a Resource ID.

Consider now a workflow that occurs between client device 202, Web server 214a, and Web service 214b in accordance with one or more embodiments. In the workflow about to be described, individual workflow items are designated by an encircled number.

Assume that a user has configured their Web browser to a default language that is not supported, for a particular Web Application, by Web server 214a. This configuration of the browser can be reflected not only by the client device's operating system settings, but by the LCID described above. Assume now, as workflow item 1, that a page request for a particular Web Application is made by Web browser 210. This can be triggered by any suitable activities such as, for example, a user entering an appropriate URL in the Web browser. The page request can include information, such as operating system settings and/or an LCID that enables Web server 214a to ascertain the language associated with client device 202.

When the Web server 214a receives a page request it can detect, from information included in the page request, the language associated with client device 202. Responsive to detecting that it does not support the language associated with client device 202 for the given Web Application, the Web server 214a can navigate the Web browser 210 to late-bind culture 250. It does this by returning, as work flow item 2, the late-bind culture 250 to the client device 202. Other items can also be returned to the client device such as application code and the like that enable an associated webpage to be rendered after late-binding occurs, as described below.

Once returned, the Web browser 210 and/or plug-in 211 parses the late-bind culture and determines the Web Application identifier and the resource set associated with the Web Application's requested webpage. The browser then requests, as workflow item 3, the relevant resources from Web service 214b, specifying both the Web Application identifier and language of the resources to be returned. The language can be specified utilizing the LCID described above. In at least some embodiments, Web service 214b can be known to the browser or plug-in in advance. Alternately or additionally, the Web service 214b can be identified in a returned page's HTML as, for example, header metadata within a defined metadata tag that the browser can interpret.

The Web service 214b uses the Web Application identifier and resource set to retrieve the set of associated translated resources, such as, for example, localized linguistic strings, and returns the translated resources, as work flow item 4, to the Web browser 210.

At this point, the translated resources can undergo a pre-page rendering process in which they are bound to the webpage. The translated resources can be bound by utilizing information 252 included in the late-bind culture 250. Recall that information 252 includes an identification of resources (e.g., by a string ID) and resource positions.

Once the resources have been bound to the webpage on the client device, the page can be rendered by the Web browser and includes localized resources, correctly formatted user interface elements, and properly executing page functionality.

Having described an example system in accordance with one or more embodiments, consider now an example method in accordance with one or more embodiments.

Example Method

Figure 3:
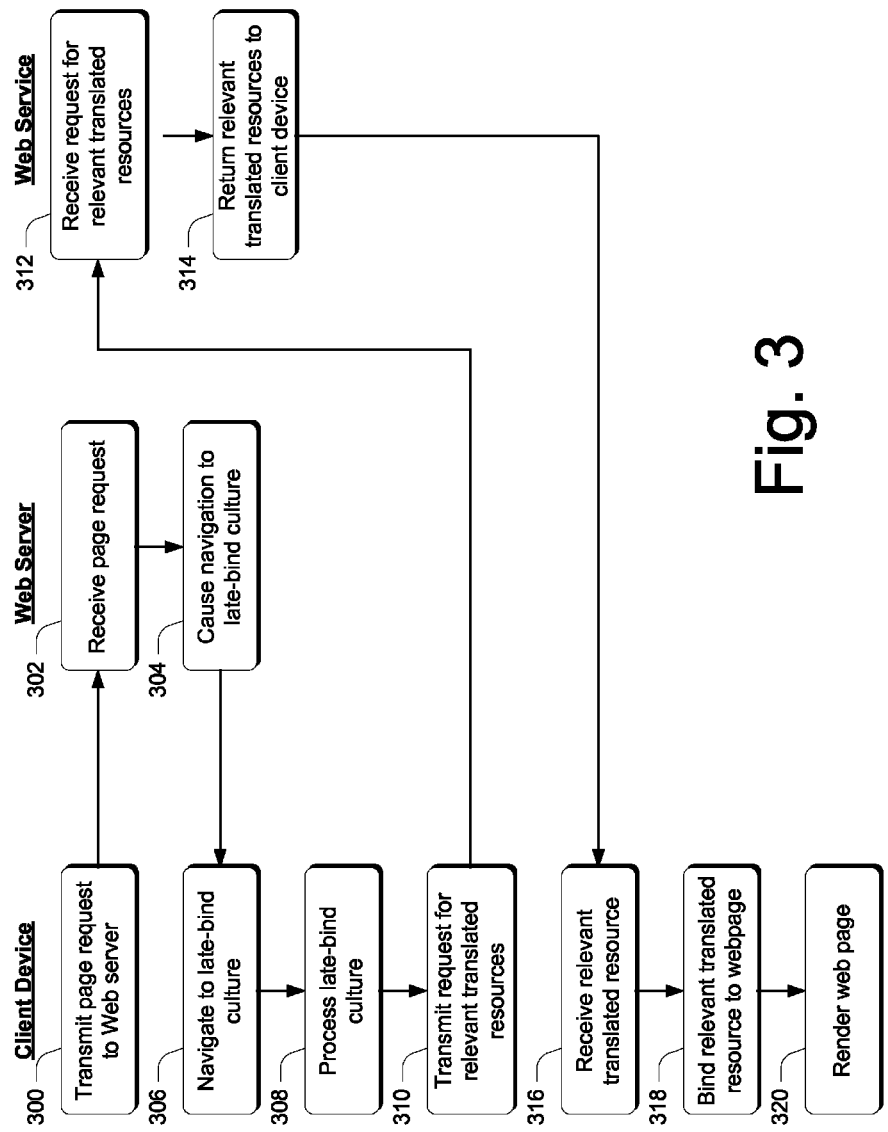
FIG. 3 is a flow diagram that describes steps in a method in accordance with one or more embodiments.

FIG. 3 is a flow diagram that describes steps in a method in accordance with one or more embodiments. The method can be implemented in connection with any suitable hardware, software, firmware, or combination thereof. In at least some embodiments, the method can be implemented utilizing software embodied on tangible, computer-readable media, examples of which are provided above and below. In addition, the method is described in connection with three different entities—a client device, a Web server, and a Web service. Aspects of the flow diagram that appear under a particular designated column are intended to be performed by the entity associated with that column. In addition, aspects of the flow diagram that appear under "Client Device" can be performed by a Web browser and/or a plug-in associated with the Web browser.

Step 300 transmits a page request to a Web server. The page request can include an indication of a language supported by the client device. In addition, in the illustrated and described embodiment, the page request can be a request for a particular Web Application.

Step 302 receives the page request and step 304 causes navigation to a late-bind culture. Step 304 can be performed responsive to the Web server ascertaining that, for the particular requested Web Application, the Web server does not support the language indicated in request. An example of a late-bind culture is provided above.

Step 306 navigates, on the client device, to the late-bind culture. Step 308 processes the late-bind culture. In one or more embodiments, the late-bind culture can be processed by ascertaining a Web Application identifier associated with the late-bind culture as well as a resource set associated with a webpage that is to be subsequently rendered. Step 310 transmits the request for relevant translated resources to a Web service. The transmitted request includes the Web Application identifier and an indication of the language of the resources to be returned.

Step 312 receives the request for relevant translated resources and, responsively, locates the relevant translated resources based on the Web Application identifier and the language indicated in the previously-received request. Step 314 returns the relevant translated resources to the client device.

Step 316 receives the relevant translated resources and step 318 binds the relevant translated resources to the webpage that is to be rendered. Binding the relevant translated resources to the webpage can include using information contained in the late-bind culture and information received from the Web service to correctly position the resources on the webpage. Step 320 renders, on the client device, the webpage with the translated resources.

It is to be appreciated and understood that step 310, performed by the client device, can be performed by requesting all resources associated with the particular Web Application. In this instance, this can include resources that may or may not be seen on the particular webpage that is to be subsequently rendered. Alternately or additionally, step 310 can be performed by requesting resources associated with the particular webpage that is to be subsequently rendered, and not requesting resources that are not to be rendered on the webpage. This latter approach would then request resources on an as-needed basis as a user experiences and navigates through the requested Web Application.

The above-described approach can preserve user interface formatting and functionality. In addition, the above-described approach supports accurate rendering of resources and frames, and the like. In addition, because data-binding is completed before the user interface is rendered, it is not visible to the user and is hence transparent.

Having described an example method in accordance with one or more embodiments, consider now an example system that can be utilized to implement the embodiments described above.

Example System

Figure 4:
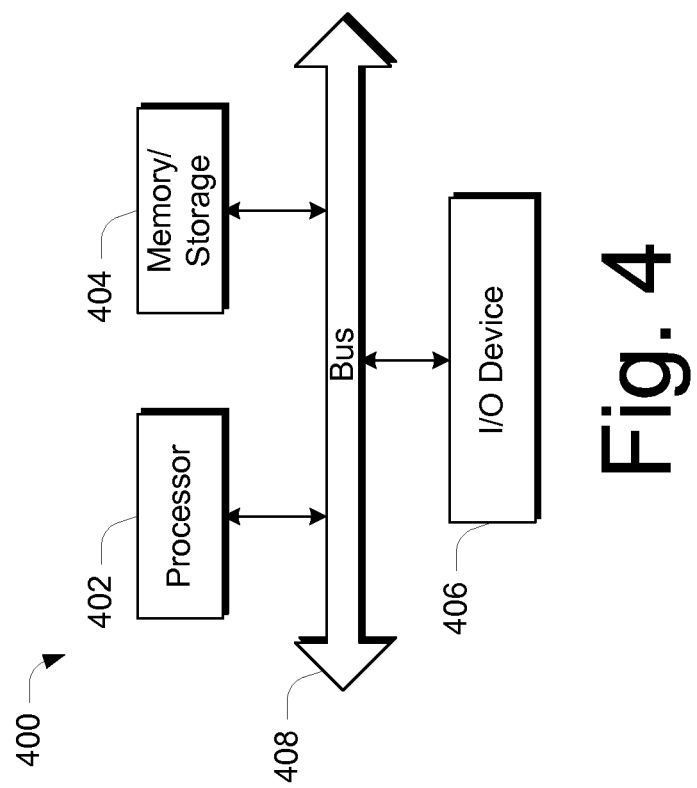
FIG. 4 illustrates an example system that can be used to implement one or more embodiments.

FIG. 4 illustrates an example computing device 400 that can be used to implement the various embodiments described above. Computing device 400 can be, for example, computing device 102 or Web server 114 of FIG. 1.

Computing device 400 includes one or more processors or processing units 402, one or more memory and/or storage components 404, one or more input/output (I/O) devices 406, and a bus 408 that allows the various components and devices to communicate with one another. Bus 408 represents one or more of any of several types of bus structures, including a memory bus or memory controller, a peripheral bus, an accelerated graphics port, and a processor or local bus using any of a variety of bus architectures. Bus 408 can include wired and/or wireless buses.

Memory/storage component 404 represents one or more computer storage media. Component 404 can include volatile media (such as random access memory (RAM)) and/or non-volatile media (such as read only memory (ROM), Flash memory, optical disks, magnetic disks, and so forth). Component 404 can include fixed media (e.g., RAM, ROM, a fixed hard drive, etc.) as well as removable media (e.g., a Flash memory drive, a removable hard drive, an optical disk, and so forth).

One or more input/output devices 406 allow a user to enter commands and information to computing device 400, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments provide a client-side approach to enable late-binding, at the client, of resources associated with linguistic strings that are retrieved from a data source that is secondary to a primary server. The client-side, late-binding approach can be performed in a manner that is generally imperceptible to users and which preserves user interface formatting and client functionality.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
    transmitting, by a client device, a page request for a Web application to a Web server;
    navigating to a late-bind culture that is hosted on the Web server and that is configured to enable resources in a language, other than languages supported by the Web server, to be bound to the Web application on the client device, the Web application being associated with the page request, and the late-bind culture being a template that specifies the Web application, one or more resources associated with the Web application, and associated resource positions;
    processing the late-bind culture at the client device, effective to transmit a request for relevant translated resources, identified by the Web application with which the resources are associated, to a Web service;
    receiving, from the Web service, the relevant translated resources;
    binding, prior to rendering, on the client device, the relevant translated resources to the Web application, the binding using the late-binding culture; and
    rendering the Web application with the relevant translated resources.

2. The computer-implemented method of claim 1, wherein the late-bind culture specifies:
    a Web Application identifier,
    the one or more resources associated with the Web Application being identified by the Web Application identifier.

3. The computer-implemented method of claim 1, wherein the late-bind culture specifies, in XML:
    a Web Application identifier,
    the one or more resources associated with the Web Application being identified by the Web Application identifier.

4. The computer-implemented method of claim 1, wherein the page request includes an identifier that identifies a language associated with the client device.

5. The computer-implemented method of claim 1, wherein at least one of the transmitting, navigating, processing, receiving or binding is performed by a Web browser.

6. The computer-implemented method of claim 1, wherein at least one of the transmitting, navigating, processing, receiving or binding is performed by a Web browser, and wherein the page request includes an identifier that identifies a language associated with the client device.

7. The computer-implemented method of claim 1, wherein at least one of the transmitting, navigating, processing, receiving or binding is performed by a plug-in associated with a Web browser.

8. One or more computer-readable storage memories embodying executable instructions which, when executed, implement a method comprising:
    processing a late-bind culture, at a client device, that is configured to enable resources, identified by a Web application with which the resources are associated, in a language other than languages supported by a Web server, to which a page request was transmitted to be bound to the Web application associated with the page request, the late-bind culture being a template that specifies the Web application, one or more resources associated with the Web application, and associated resource positions;
    responsive to said processing, receiving, from a Web service, translated resources; and
    binding, prior to rendering the Web application, on the client device, the translated resources to the Web application.

9. The one or more computer-readable storage memories of claim 8, wherein the instructions reside in the form of a web browser.

10. The one or more computer-readable storage memories of claim 8, wherein the instructions reside in the form of a browser plug-in.

11. The one or more computer-readable storage memories of claim 8, wherein the instructions further comprise instructions to implement a method comprising:
    prior to said processing, transmitting a page request for the Web application to the Web server, wherein the page request includes an identifier that identifies a language associated with the client device.

12. The one or more computer-readable storage memories of claim 8, wherein the late-bind culture specifies:
    a Web Application identifier,
    the one or more resources associated with the Web Application being identified by the Web Application identifier.

13. The one or more computer-readable storage memories of claim 8, wherein the late-bind culture specifies, in XML:
    a Web Application identifier,
    the one or more resources associated with the Web Application being identified by the Web Application identifier.

14. The one or more computer-readable storage memories of claim 8, wherein the instructions further comprise instructions to implement a method comprising rendering the Web application on the client device.

15. A Web server comprising:
    one or more processors;
    one or more computer-readable storage media;
    computer-executable instructions embodied on the one or more computer-readable storage media which, when executed, implement a method comprising:
        receiving, from a client device, a page request for a Web application; and
        responsive to detecting that a language associated with the client device is not supported by the Web server, causing the client device to be navigated to a late-bind culture that is hosted on the Web server and that is configured to enable resources in the language to be bound to the Web application, prior to rendering the Web application, on the client device, the late-bind culture being a template that specifies the Web application, one or more resources associated with the Web application, and associated resource positions.

16. The Web server of claim 15, wherein the late-bind culture is configured to enable the resources to be obtained from a Web service separate from the Web server.

17. The Web server of claim 15, wherein the late-bind culture specifies:
    a Web Application identifier,
    the one or more resources associated with the Web Application being identified by the Web Application identifier.

18. The Web server of claim 15, wherein the late-bind culture specifies, in XML:
    a Web Application identifier, the one or more resources associated with the Web Application being identified by the Web Application identifier.

19. The Web server of claim 15, wherein the page request includes an identifier that identifies a language associated with the client device.

20. The Web server of claim 15, wherein the resources in the language to be bound to the Web application are identified by the Web application and a resource identifier.

\* \* \* \* \*